United States Patent [19]

Davis et al.

[11] Patent Number: 4,557,474
[45] Date of Patent: Dec. 10, 1985

[54] DUPLEX DOCUMENT COPYING MACHINES

[75] Inventors: James W. Davis, Richardson; Thomas J. DiFloria, Allen; Larry D. Propst, Rowlett, all of Tex.

[73] Assignee: The Mead Corporation, Dayton, Ohio

[21] Appl. No.: 622,813

[22] Filed: Jun. 21, 1984

[51] Int. Cl.⁴ ............................................. B65H 29/54
[52] U.S. Cl. .................... 271/301; 271/186; 271/308; 271/311; 271/900
[58] Field of Search ............... 271/291, 301, 307, 308, 271/311, 312, 186, DIG. 2, 900

[56] References Cited

U.S. PATENT DOCUMENTS 3,545,746 12/1970 Ledger et al. .
3,591,281 7/1971 Kruhlinski .
3,839,958 10/1974 Kent et al. .
4,065,119 12/1977 Schroter ............................. 271/301
4,285,507 8/1981 Marinoff ......................... 271/301 X
4,441,806 4/1984 Davis .

*Primary Examiner*—Richard A. Schacher
*Attorney, Agent, or Firm*—Biebel, French & Nauman

[57] ABSTRACT

An automatic document handler for a duplex copier is disclosed in which an inverting drum is employed for inverting documents which are to be copied on both sides (duplex copying). The inverting drum is provided with pressure or transport belts which carry a document over a portion of the surface of said drum, and a diverter gate arrangement is provided at the exit side of the belts, adjacent the drum, for selectively providing for passage of the document to a collection station, or alternatively, for causing the documents to re-enter toward the drum for delivery to a duplex scanning station. The diverter gate arrangement includes a relatively fixed stripper which is positioned adjacent the surface of the drum, which stripper cooperates with a movable gate. In one position of the gate, a nose portion of the gate is nested with the stripper and permits documents to pass thereover to a collection station. In a second position, the gate intercepts documents from the stripper and from the pressure belts and causes the same to be redirected toward the drum for duplex copying.

6 Claims, 7 Drawing Figures

DUPLEX DOCUMENT COPYING MACHINES

BACKGROUND OF THE INVENTION

This invention pertains to a duplex document copying machine, and more particularly, to such a machine in the form of an automatic document handler, which incorporates a drum for the selective inversion of documents and delivery to a duplex scanning station.

The apparatus of the present invention is directed to a copier of the general type shown in Davis U.S. Pat. No. 4,441,806 issued Apr. 10, 1984, in which sheet type documents are delivered serially to a simplex scanning station, and moved past the station at a controlled rate. From the simplex station each document is delivered to a duplex drum, in which document guiding elastic transport belts partially encircle the upper surface of the drum. After traversing an upper portion of the drum, the document lead edge is stripped from the drum and presented to a duplexing gate positioned transversely of the drum. If the document has been programmed to be copied on one side only, the gate will be closed when the lead edge arrives, allowing the document to pass directly out of the machine to a collection station. However, if the job was programmed for duplex copying (two-sided originals), the duplex gate will be opened and the document then directed toward the nip of an idler roller in contact with the drum and in combination with guides, is carried to a duplex platen or scanning station for traversing movement past the scanning station. After duplex scanning, the leading edge of the document is carried up circumferentially about the drum, where it rejoins the simplex document path at a vertical tangent on the duplex drum. After transport across the top half of the drum, the document leading edge is again stripped and presented to the duplex gate. The gate is now closed, directing the document to a document receiving tray as in simplex operation.

In U.S. Pat. No. 4,441,806, a document diverter gate arrangement is disclosed, by means of which the document is either stripped from the drum or is permitted to traverse about the surface of the drum to the duplex scanning station. However, since the surface of the drum is coated with a white elastomer blanket, to provide a white background at the duplex window, and since the proper operation of the automatic document handler requires optical pickups to detect the presence and location of the document with respect to the drum, it has proved difficult to detect the document at the gate, due to lack of contrast. Attempts to calculate the position of the document taken from a measurement prior to the document entering the drum has proved to be difficult, in view of variations in the times taken by different documents to arrive at the duplex station. This is believed to be primarily due to the fact that documents must be handled of substantially differing weights, and the differences in weight result in small differences in the actual distance traveled from a nominal distance, thereby creating registration errors. Accordingly, a need has arisen for a document lead edge detector to be placed substantially closer in the travel path of the document to the duplex station for the proper programming of duplex copying.

SUMMARY OF THE INVENTION

The present invention is directed to a duplex document copier incorporating an inverting drum, and further incorporating a diverter gate, in which the gate is provided with or cooperates with a relatively fixed stripper. The non-moving stripper is positioned at the exit region of the drum and somewhat beyond the point of tangency of the tension or transport belts, and assures that all documents which have been carried from the drum are actually stripped from the drum surface at this point. This provides two primary advantages. First, where only simplex copying is desired, and where it is not necessary to assure accurate registration of the lead edge of the document thereafter, it is nevertheless important to assure that all documents have been stripped from the drum. Stripping is not so much a problem with normal papers which are relatively stiff and tend to follow the pressure belts and not the drum. However, this is not the case with thin papers or tissues which may tend to follow the drum rather than the belts, at the point of exit tangency, thus requiring stripping to remove the same so that the documents may properly flow to a collection station. Second, stripping permits the document to be more easily sensed by an optical document sensor, since it removes the document from the surface of the white drum and into the path of the sensor. By placing a sensor at the stripper-diverter, accurate timing of the lead edge can be determined at a region relatively close to the duplex scanning station, thus permitting timing correction, permitting the carriage to be moved at the duplex scanning station at the proper or required time, or otherwise permitting the error to be accounted for.

The combined stripper and duplex gate are mounted on a common mounting structure. The gate is mounted for pivotal movement about an axis from a position in which one surface of the gate engages documents stripped from the drum and provides a guide for such documents toward a delivery station, while in another position an inner surface of the gate engages a stripped document and causes the same to follow such inner surface between the gate and the stripper, for photodetection, and for duplex delivery. Pinch rollers cooperate with the drum surface and provide for re-entry of the document at the bottom circumference of the drum and controlled delivery to the duplex station.

It is accordingly an important object of this invention to provide a document diverter gate in combination with a duplex drum incorporating a relatively non-moving stripper, which effectively intercepts documents from a drum and selectively diverts the same to a collection station or causes the documents to re-enter, for duplex copying.

A further object of the invention is the provision of a duplex copying machine incoporating a stripping mechanism which includes a fixed or relatively non-moving stripper in combination with a diverter gate in which the gate is formed with an inner curved document guiding surface, which joins an outer document guiding surface along a generally common upper edge or margin, which margin effectively nests with the stripper, in one position of the gate.

A still further object of the invention is the provision of a document handler including a duplex drum with a relatively stationary stripper having a knife edge running in close relation to the surface of the drum, for stripping documents from the drum, and a diverter gate which is movable from a first position in which the gate is nested closely downstream of the stripper knife edge to permit documents to slide thereover, to a second position in which the gate is moved to intercept documents from the stripper and cause the same to follow the general contour of the drum.

These and other objects and advantages of the invention will be apparent from the following description, the accompanying drawings, and the appended claims.

DESCRIPTION OF THE PREFERRED EMBODIMENT

Figures 1, 2:
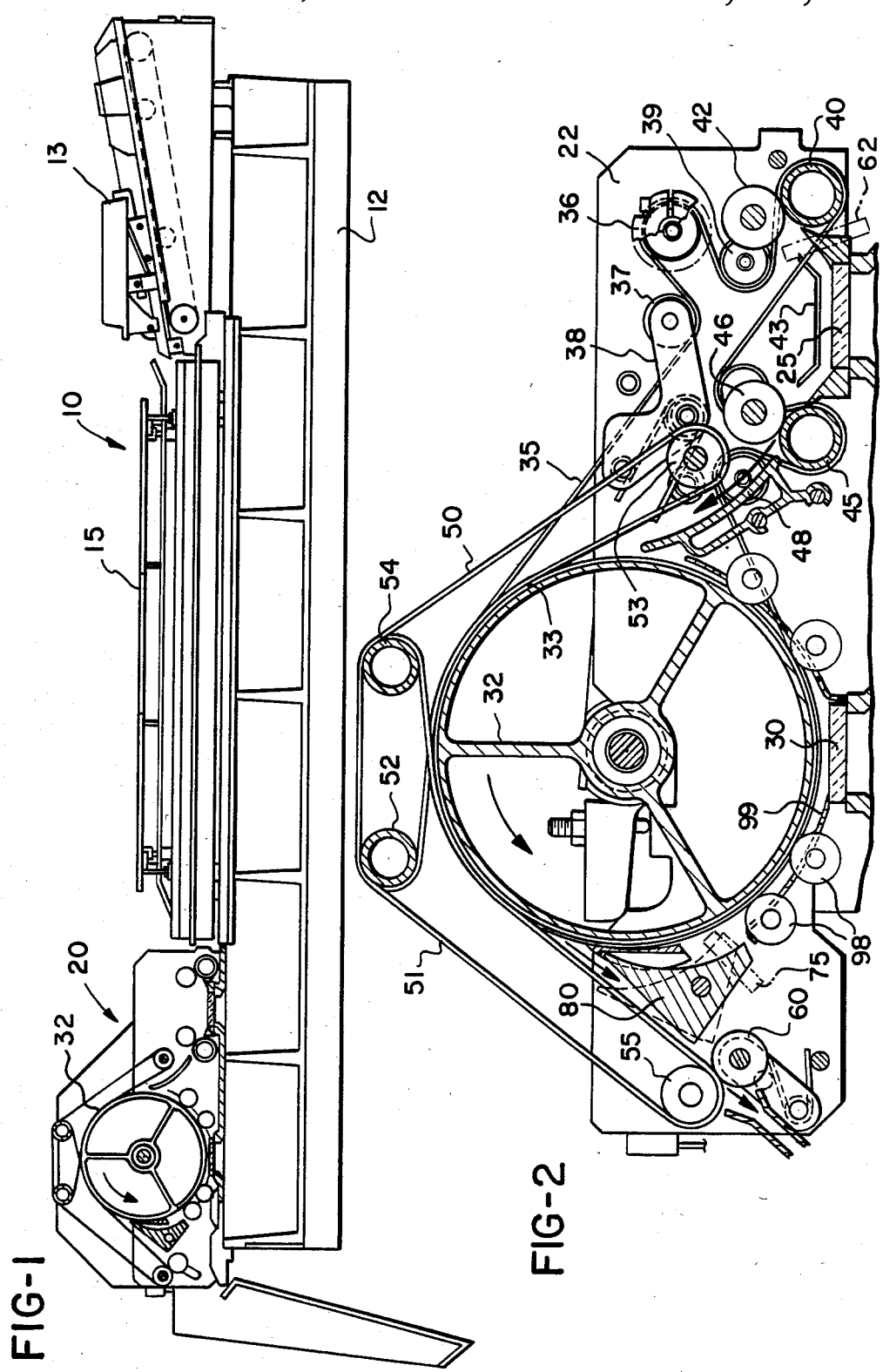
FIG. 1 is a side elevation, partly broken away, of an automatic document handler according to this invention.
FIG. 2 is an enlarged section side elevational view of the scaning station.

Referring to the figures of the drawing which illustrate a preferred embodiment of the invention, an automatic simplex/duplex document handler and copier is shown generally at 10 in FIG. 1 as including a support frame 12. The frame incorporates a scanner as shown in Davis U.S. Pat. No. 4,441,806 (not shown), and further incorporates document handling apparatus in the form of a document feed assembly 13, a combined platen and document alignment station 15, and a document scanning station 20. The feed assembly 13 provides means for serially feeding stacked individual documents to the platen and alignment station 15 which may be constructed according to U.S. Pat. No. 4,441,806. The alignment station 15 and the feed assembly 13 assure that the documents are presented to the scanning station 20 in proper alignment and with proper spacing therebetween.

Figure 3:
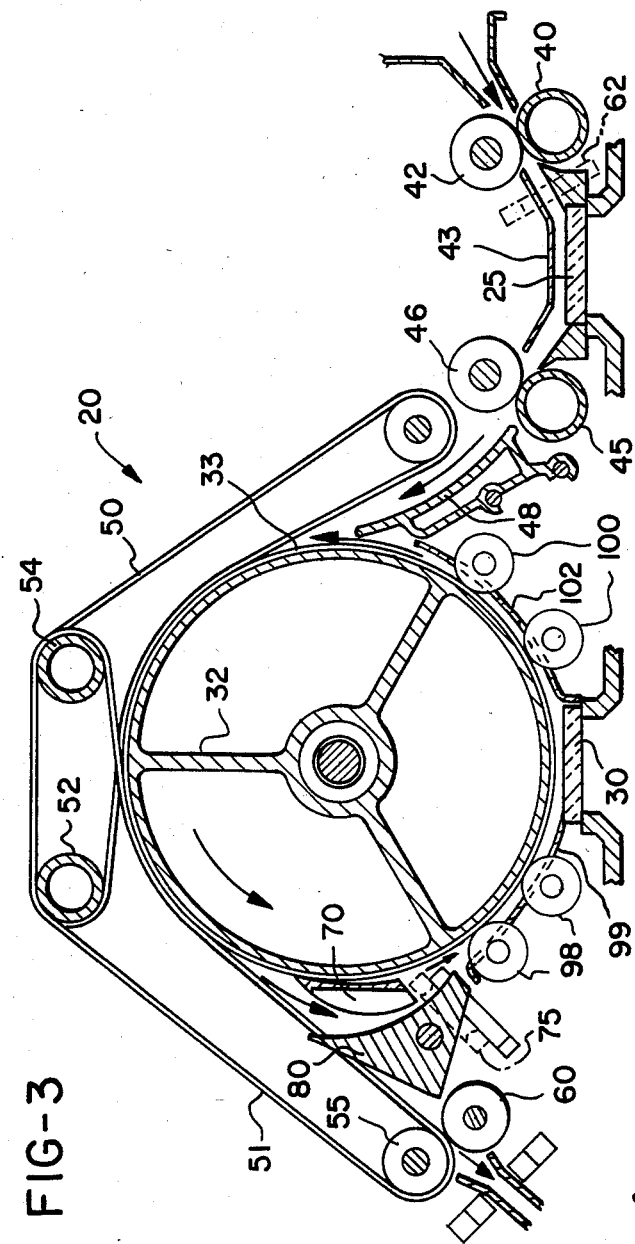
FIG. 3 is a view similar to FIG. 2 showing the diverter gate in the duplex scanning mode.

The major operative details of the scanning station 20 are illustrated in FIGS. 2 and 3. The scanning station 20 includes a frame 22 which supports a simplex document scanning window 25 and which further supports a duplex scanning window 30. The windows 25 and 30 are laterally spaced on the frame 12, in a common plane. For simplex copying, one side of a document will be presented to and caused to traverse the window 25 at a controlled rate. For duplex copying the document must be inverted and caused to traverse the duplex scanning window or station 30. The transport mechanism incorporated in the scanning station includes an inversion drum 32 which has a white blanket 33 on its outer surface.

The transport movement within the scanning station 20 is provided by an endless belt 35 which is driven from the pulley 36. Pulley 36 is a reduction pully which is in turn driven by another belt from the pulley of a motor, not shown. The belt 35 encircles the major portion of the circumference of the drum along one marginal edge, and tension is maintained by a tension roller 37 mounted on a spring-biased tension arm 38. The drive belt 35 is threaded over an idler 39, and then over the driven roll 40 of a pinch roll pair 40, 42. Roll 42 is an idler and the nip between the rolls 40 and 42 receives documents which are fed thereto from the alignment station 15 for delivery at a controlled rate over and against the simplex scanning window 25. The position of a document at the window 25 is maintained in the space between the window and an upper sheet metal guide 43, and the alignment of the window with respect to the lead-in angle of the rollers 40, 42 assures that the paper will be caused to slide along the upper surface of the window 25.

When the document leaves the simplex window 25 it passes through a second pair of rollers 45, 46. The roller 46 is an idler while the roller 45 is also driven by the belt 35, and since the drive rollers 45 and 40 have the same diameter, they rotate at the same speed. The alignment of the roller pair 45, 46, delivers the document exiting from the simplex station 25, past a metal guide 48 in a direction which is substantially tangent to the surface of the duplex drum 32.

The document is held in contact with the upper half of the drum 32 by two series of free-turning elastic transport belts 50, 51. A plurality of the belts 50 and 51 are placed in side-by-side relation, with the belts 50 being threaded over roller 52 and idler roller 53 and guided over the top of an idler roller 54, while belts 51 are threaded over roller 54 and idler roller 55, and over the top of roller 52. The belt sets are driven by the rotation of the drum and provide a transport nip to carry a document exiting the simplex station 25 and the guide 48 over the upper circumference of the drum, normally to a delivery station through an idler roll 55 and a spring-biased nip roller 60. The path of a document, to be copied on one side, is illustrated by the arrows of FIG. 2.

Figure 5:
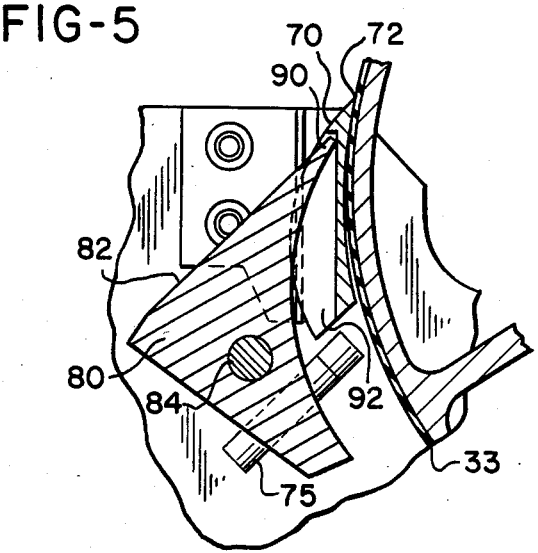
FIG. 5 is an enlarged fragmentary view of the stripper and gate in one position of the gate.
Figure 6:
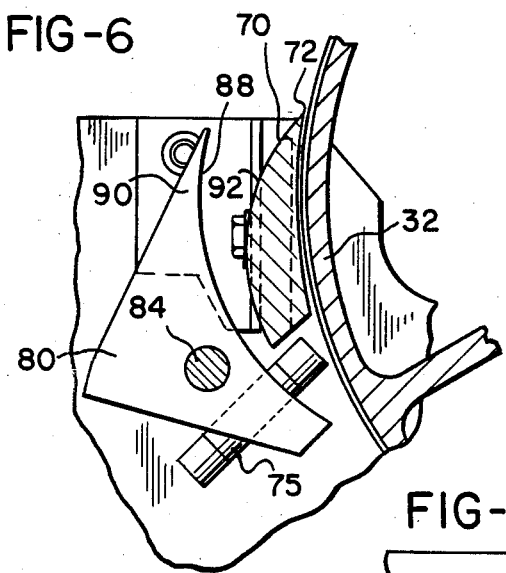
FIG. 6 is a view similar to FIG. 5 showing the moved position of the gate.

It is important that the scanning rate and movement of documents through the scanning station be accurately controlled. A preferred arrangement includes a stepper motor which drives roll 36, in which the motor steps are counted. Alternatively, a precision shaft angle encoder may be used to provide a train of encoder pulses. The registration of a document entering the simplex scanning station may be determined by a lead edge detector 62, positioned between the nip of the roll pair 40, 42, and the scanning station. While the sensor 62 times the arrival of the leading edge of a document at the simplex scanning station, this time cannot consistently be used to predict the arrival of the leading edge at the duplex station 30 in the event duplex copying is required. Further, since documents, such as tissues, may tend to follow the surface of the drum, rather than exit at the point of tangency of the belt 51 to the drum, the invention includes a fixed transversely oriented stripper 70, as best shown in FIGS. 5 and 6. The stripper 70 is stationary relative to the frame 22, extends transversely between the side walls of the frame and includes a leading knife-like nose or edge 72 which is positioned in closely spaced relation to the drum surface. The stripper 70 is thus positioned at the exit region of the belts 51 in underlying relation to the belts. It is almost quarter-moon shape in section, and is adjusted so that the nose 72 has about 0.015" clearance with the drum surface. This clearance should be as small as practical to facilitate document stripping without dragging against the surface of the drum. The lower portion of the stripper 70 is cut away to facilitate the positioning of a duplex optical sensor 75, as shown in FIGS. 5 and 6.

A document diverter gate 80 cooperates with the stripper. In a first position, as shown in FIG. 5, an upper surface 82 forms essentially a continuation of the path of documents removed by the stripper 70 and forms a guide to carry the documents to the nip of the pinch rolls 55–60, as shown in FIG. 2. The gate 80 is mounted on a transverse shaft 84, extending between the side plates of the frame, and is movable from the first position as shown in FIG. 5, to a second or "duplex" position shown in FIG. 6. In the second position, the gate 80 presents to the path of the documents an inner curved generally cylindrical inwardly facing surface 88. The surface 88 joins the outer surface 82 along a common nose portion or end 90 at an acute angle. In the second position the diverter gate 80 intercepts the documents from the stripper and from the exit belts 51, and causes the same to be moved downwardly along its curved surface and past the duplex sensor 75, for duplex copying.

Figure 4:
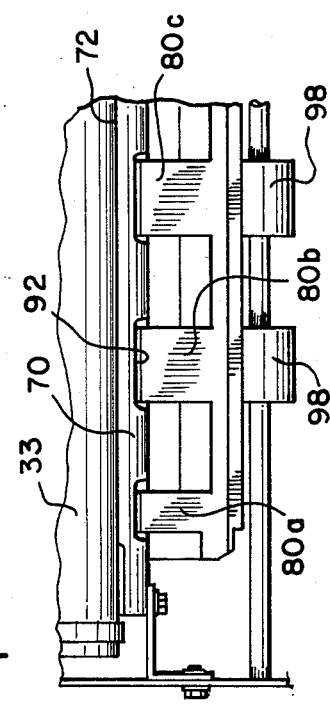
FIG. 4 is a fragmentary elevational view of the diverter gate.

As perhaps best seen in the fragmentary view of FIG. 4, the gate 88 is actually formed as a transverse series of individual gate elements 80a, 80b, etc., which are interspaced between the belts 51 so that in the duplex or moved position of the gate as shown in FIG. 6, the elevated noses or ends 90 of the gates 80 actually extend outwardly beyond the path of the inside runs of the belts 51. This relationship is shown in FIG. 3, and assures that all documents will be intercepted from the drum for delivery to the duplex scanning station.

In the first position or the simplex position of the gate, shown in FIG. 5, the nose 90 of the gate 80 nest within a cut-outs or recesses 92 formed in the back of the stripper 70. In this manner, each nose 90 is recessed with respect to the line of travel of documents, and the arcuate or back curved surface 92 of the stripper 70 cooperates with the surface 82 of the gate 80 to provide a smooth and unbroken guiding surface for documents in the simplex mode, essentially free of gaps.

Figure 7:
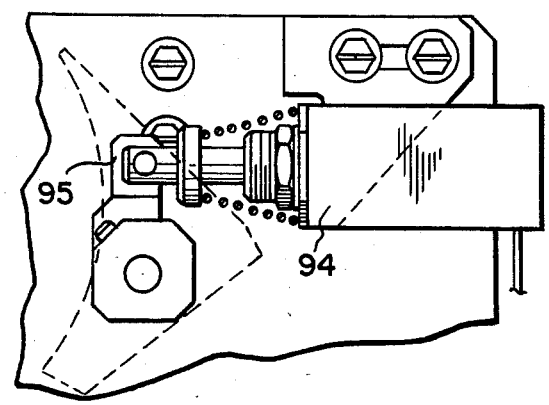
FIG. 7 is a fragmentary view showing the gate-operating solenoid.

A movement of the gate 80 between its first and second positions, that is, between the simplex and duplex positions may be controlled by a single tubular solenoid 94, shown in FIG. 7. A solenoid 94 is mounted to one of the side walls and operates the support shaft 84 through an exterior arm 95.

The lead edge of the documents, in the duplex mode, as shown in FIG. 3, are delivered to the nip of a pair of idler rolls 98, and a paper guide 99, to the upper surface of the duplex scanning station 30, which is located immediately below the drum 32. From there it is delivered to a second pair of idler rollers 100 and a sheet metal guide 102 generally upwardly, as shown by the arrows of FIG. 3, to re-enter the original path over the top of the drum 32. During this period of time, the gate 80 will be returned to its original position so that the document will now follow the simplex path to the exit station.

Prior to the transport of the document past the duplex window 30, the scanning carriage is moved to the duplex position from the simplex position, where the document is then scanned in the manner previously described in U.S. Pat. No. 4,441,806 in accordance with a controlled rate of movement of the document.

The operation of the invention is largely self-evident from the foregoing description. It will be seen that the invention provides a combined stripper and gate assembly which includes a relatively fixed stripper and movable gate which cooperate to define the simplex and duplex modes, with respect to an inverting drum. The gate curved surface 88 may be considered as a first document guiding surface which is positioned adjacent the drum, while the surface 82 may be considered as a second guiding surface remote from the drum, with the surfaces being joined along the common margin at the nose 90. Therefore, the surface 88 is presented to the documents in the duplex mode, as shown in FIG. 6, causing all of the documents to engage the lead edge duplex detector 75, while the surface 82 cooperates with the curved back surface 92 of the stripper 70 to guide the stripped documents toward the exit station, in the simplex mode.

While the form of apparatus herein described constitutes a preferred embodiment of this invention, it is to be understood that the invention is not limited to this precise form of apparatus, and that changes may be made therein without departing from the scope of the invention which is defined in the appended claims.

What is claimed is:

1. A copier for sheet documents including a document inverting drum and pressure belts associated with the drum for carrying documents over a surface of a drum, the improvement in apparatus for selectively deliverying such documents for discharge from the drum to an exit region or for inversion by the drum, comprising:
    a relatively fixed document stripper blade positioned transversely of surface of the drum in close proximity thereto and underlying said pressure belts adjacent the region of tangency of said belts for separating documents from the surface of the drum, and
    a transversely oriented deflector gate positioned adjacent said blade, said deflector gate movable between a first position providing for document movement from said stripper blade to said exit region and a second position in which said deflector gate engages documents exiting said drum at said blade for causing said documents to be diverted in the direction of said drum for inversion.

2. The copier of claim 1 in which said gate is provided with a first generally inwardly facing curved surface with respect to said drum which is adapted to engage and deflect documents toward said drum, and a second surface remote from said drum providing a guiding surface for documents exiting said drum at said stripper blade, said first and second surfaces being joined at an acute angle along a common margin defining a nose portion, said gate in said first position having said nose portion in close proximity to said blade, and in said second position elevated to intercept documents from said belt and present the same to said curved surface.

3. The copier of claim 2 in which there are a plurality of transverse pressure belts in cooperative association with said duplex drum, and in which said gate is formed in segments intermediate said belts.

4. The copier of claim 2 in which said blade, on a side thereof remote from said drum, is provided with means defining a recess, and in which said nose portion of said gate in said first position is nested within said recess to provide a path to the exit region which is essentially free of gaps.

5. The copier of claim 1 including means at said blade forming an edge detector for detecting the occurrence of an edge of a document therepast.

6. A duplex copier for copying sheet documents by scanning such documents on one or on both sides, including a drum having pressure belts for carrying documents along a surface of the drum, the drum providing for inversion of documents and delivery to a duplex scanning station, the improvement in gating apparatus for selectively delivering documents for discharge from the drum to a collection station or for duplex copying by delivery to a duplex scanning station, comprising:

a relatively fixed transversely oriented document stripper blade positioned in close proximity to the surface of the drum and in underlying relation to the pressure belts at an exit region of the belts for separating any document from the surface of the drum which tends to follow the drum beyond a point of tangency with the belts, a transversely oriented diverter gate cooperatively arranged with said stripper blade, said diverter gate having a first document guiding surface positioned adjacent said drum and having a second document guiding surface remote from said drum, said surfaces being joined along a common margin of said gate, and means mounting said gate adjacent said drum and in cooperative relation to said blade for movement between a first position in which said second surface is presented to documents exiting said drum at said stripper blade for diverting said documents away from said drum and to said collecting station, and a second position in which said first surface is presented to documents exiting said drum at said stripper blade for deflecting said documents toward said duplex scanning station.

* * * * *